June 2, 1925.
A. F. STODNECK
LID HOLDER
Filed May 10, 1924
1,540,375
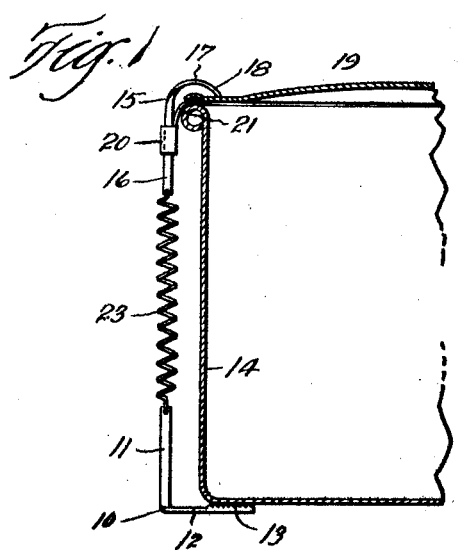
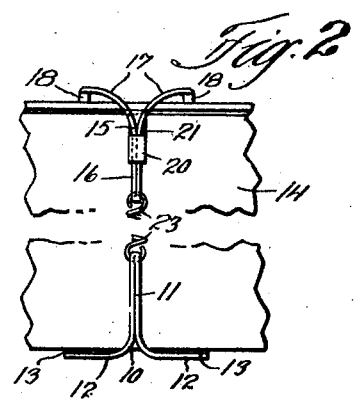
Inventor
Anton F. Stodneck Patented June 2, 1925.

1,540,375

UNITED STATES PATENT OFFICE.

ANTON F. STODNECK, OF CLEVELAND, OHIO.

LID HOLDER.

Application filed May 10, 1924. Serial No. 712,266.

*To all whom it may concern:*

Be it known that I, ANTON F. STODNECK, a citizen of the United States, residing at Cleveland, in the county of Cuyahoga and State of Ohio, have invented a certain new and useful Improvement in Lid Holders, of which the following is a full, clear, and exact description, reference being had to the accompanying drawings.

This invention relates to lid holders for pots, kettles and other cooking utensils and has for its objects, to provide a particularly simple and inexpensive lid holder which may be easily applied to various sized utensils and which shall effectively hold the cover in place while pouring or otherwise handling the utensil; to provide a lid holder of the aforesaid character which shall include means that may be adjusted to hold the lid partially elevated and permit the escape of steam or to facilitate draining or pouring; while further and more limited objects will appear as the description proceeds.

In the accompanying drawing, Fig. 1 is a fragmentary vertical sectional view through a vessel fitted with a cover holder; and Fig. 2 is a fragmentary side elevation thereof.

In Figs. 1 and 2 I have shown a form of lid holder which consists of a bottom hook 10 formed from a single piece of metal bent upon itself to define a vertically extending arm 11 and a pair of horizontally divergent arms 12, each of which is provided with a roughened surface 13 to insure a firm grip upon the bottom of a vessel 14 to which it is applied. The upper hook 15 is also preferably formed from a single piece of metal bent upon itself to form a vertically extending arm 16 and upwardly and outwardly divergent arms 17, the ends of which are deflected downwardly as indicated at 18 to engage the lid or cover 19 of the vessel. Slidably mounted on the vertical arm 16 is a tubular member 20 having an arm 21 which is adapted to engage between the lid 19 and vessel 14 and slightly raise the lid therefrom so as to permit steam to escape while cooking, if desired, or to facilitate pouring the contents from the vessel. When not in use, the arm 21 may be withdrawn from between the lid and vessel and the slider moved downwardly permitting arm 21 to project inwardly beneath the bead of the vessel. A spring 23 is connected between arms 11 and 16 of the lower and upper hook members and exerts a pull therebetween when the device is in position on the vessel.

Having thus described my invention, what I claim is:—

A lid holder for cooking utensils comprising a pair of hook members each formed from a single piece of metal bent upon itself to define a vertically disposed arm and outwardly diverging horizontally disposed arms, the horizontal arms of the lower member being adapted to engage the bottom of a vessel, the ends of the horizontal arms of the upper member being deflected downwardly to engage the lid of the vessel, a member slidably mounted on the vertical arm of said upper member and having a projection adapted to engage between said lid and vessel, and tension means interconnecting the vertical arms of said members.

In testimony whereof I hereunto affix my signature.

ANTON F. STODNECK.